A. WEBER, W. E. LEIBING & J. P. H. JACOBSEN.
GEAR SHIFTING DEVICE.
APPLICATION FILED APR. 6, 1918.

1,300,902.

Patented Apr. 15, 1919.
6 SHEETS—SHEET 1.

WITNESS

INVENTORS
BY
ATTORNEYS

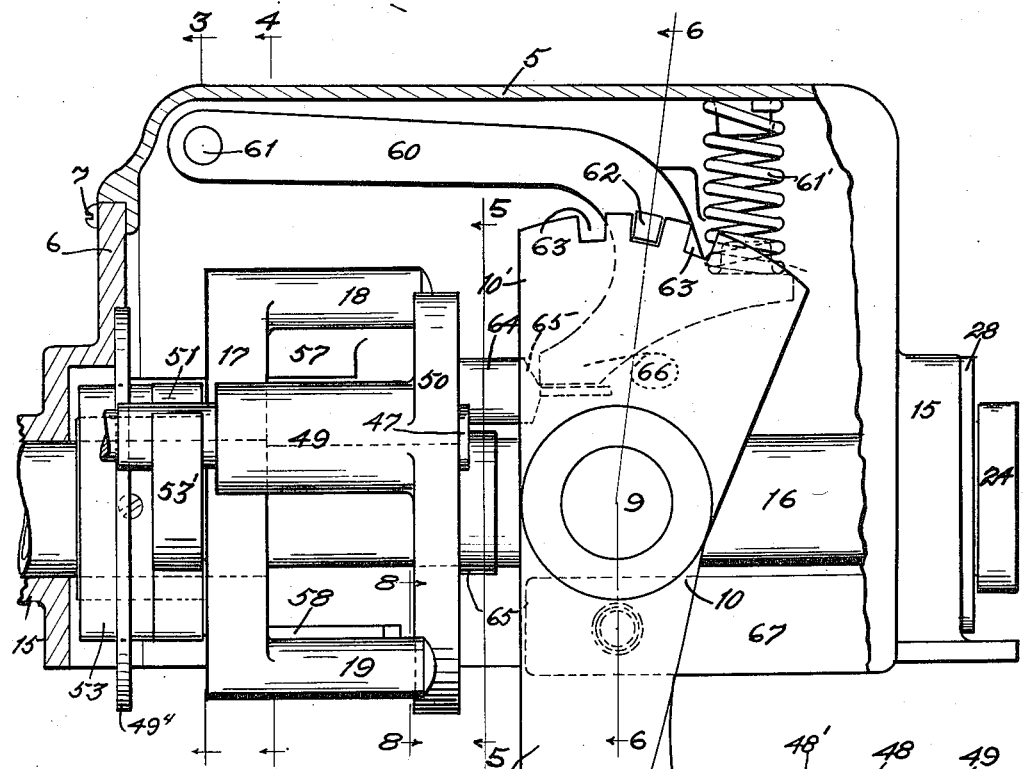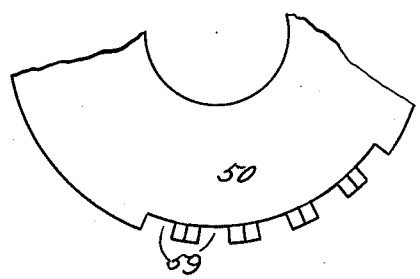

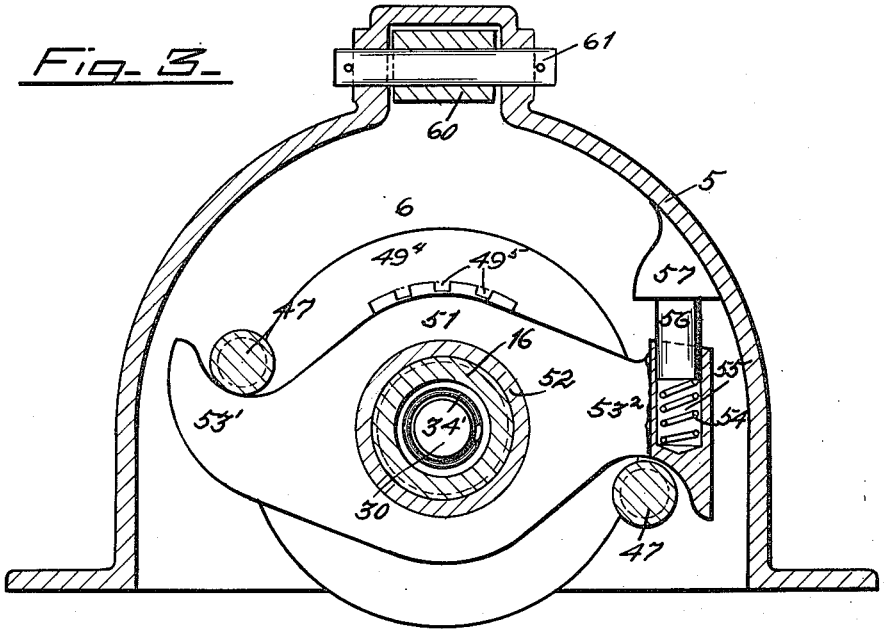
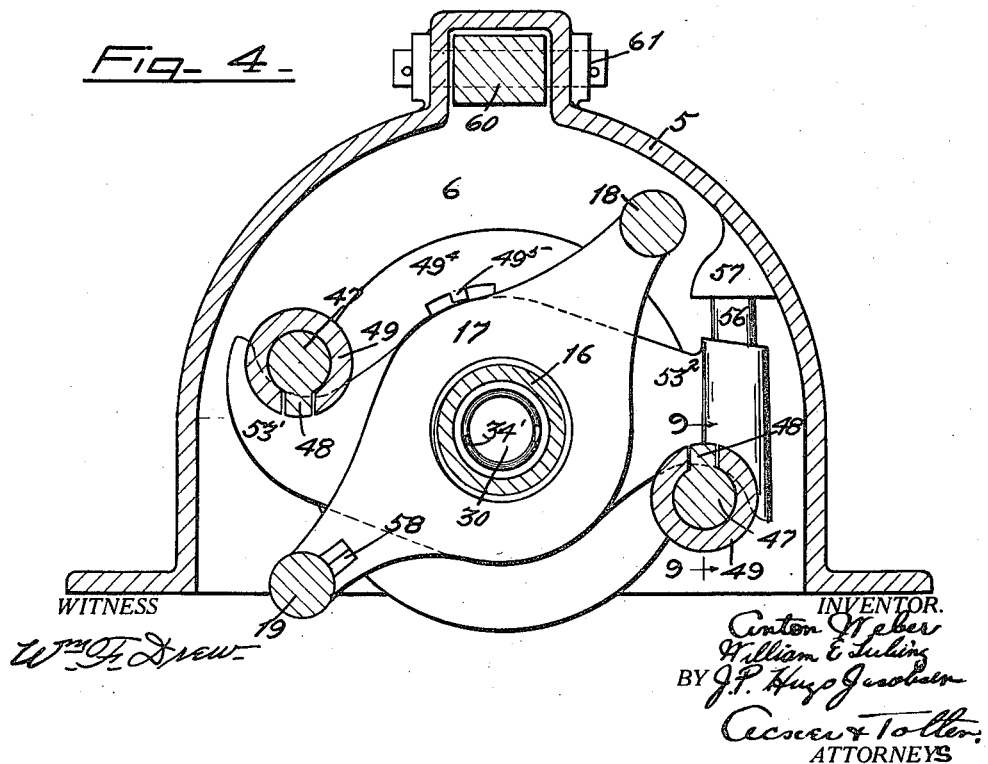

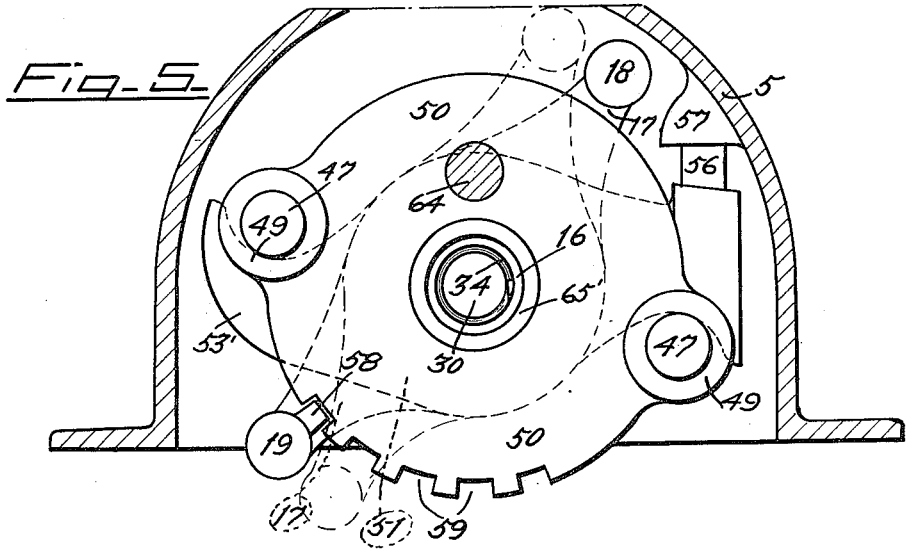
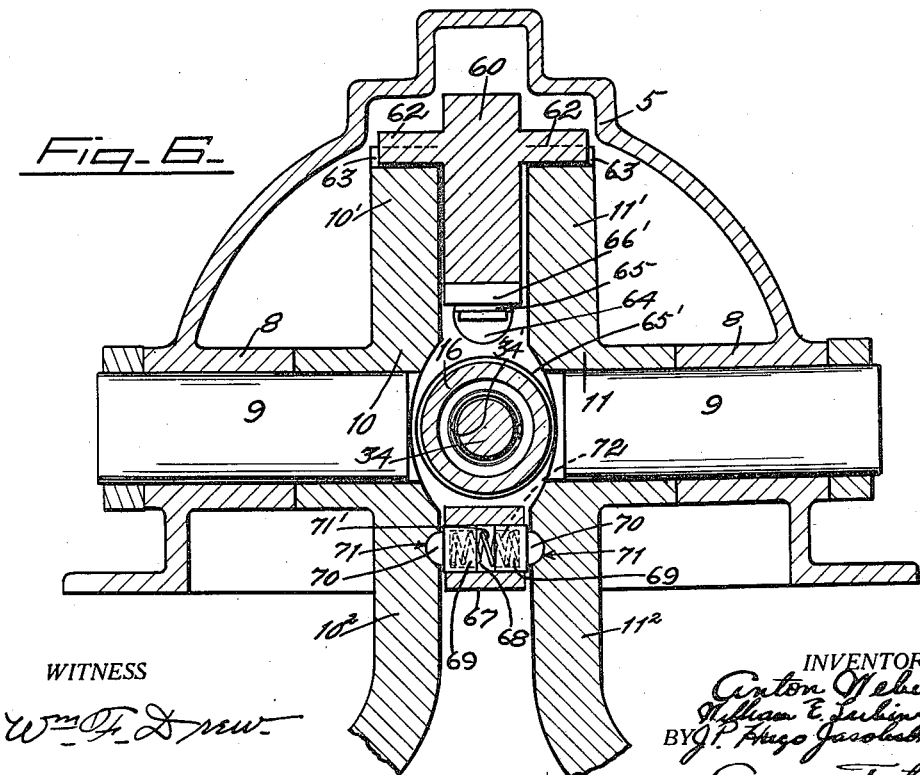

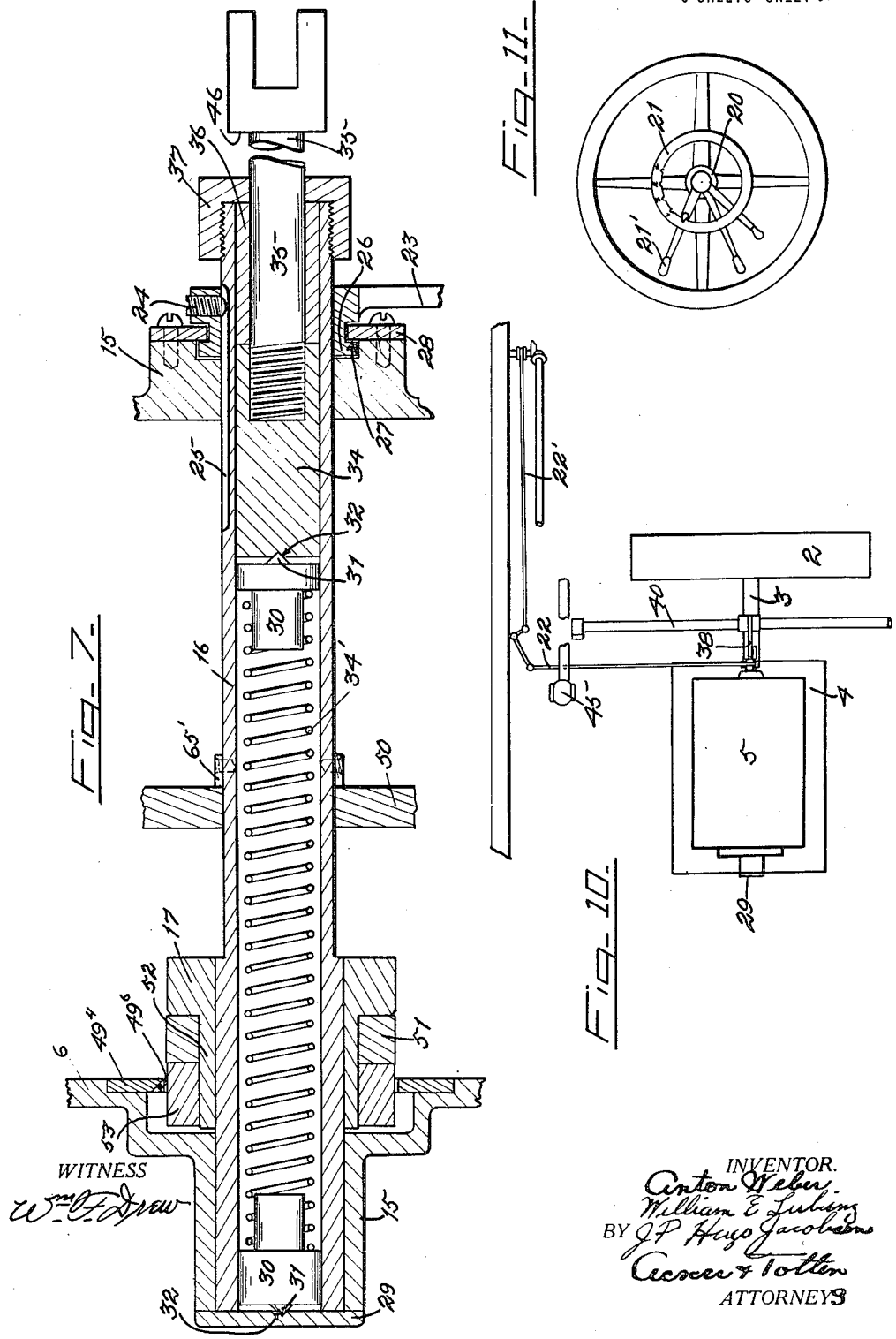

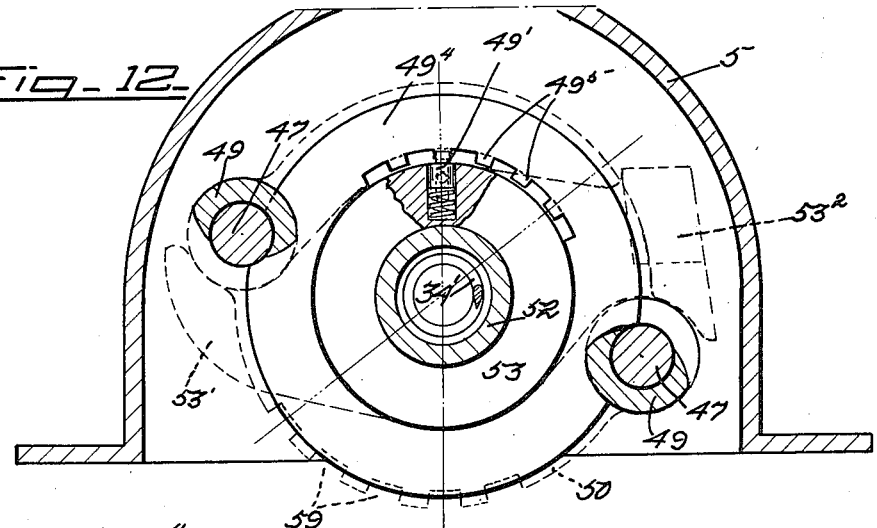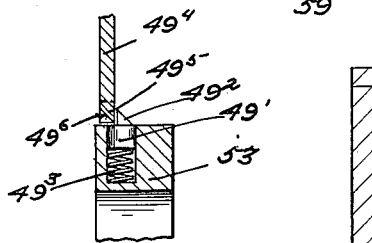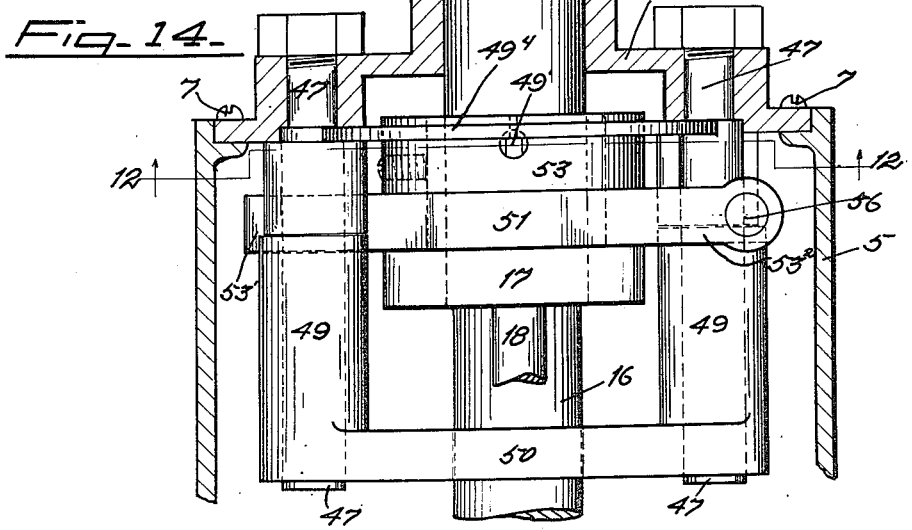

UNITED STATES PATENT OFFICE.

ANTON WEBER AND WILLIAM E. LEIBING, OF OAKLAND, CALIFORNIA, AND JAMES PETER HUGO JACOBSEN, OF CHICAGO, ILLINOIS, ASSIGNORS TO UNITED STATES AUTO GEAR SHIFT COMPANY, OF OAKLAND, CALIFORNIA, A CORPORATION OF CALIFORNIA.

GEAR-SHIFTING DEVICE.

1,300,902.  Specification of Letters Patent.  Patented Apr. 15, 1919.

Application filed April 6, 1918. Serial No. 226,984.

*To all whom it may concern:*

Be it known that we, ANTON WEBER, WILLIAM E. LEIBING, and JAMES PETER HUGO JACOBSEN, citizens of the United States, residing, the said WEBER and LEIBING at Oakland, in the county of Alameda and State of California, and the said JACOBSEN at Chicago, Cook county, State of Illinois, have invented certain new and useful Improvements in Gear-Shifting Devices, of which the following is a specification.

The present invention relates to improvements in mechanical gear shifting devices for motor vehicles, and more particularly to that type of apparatus set forth in our co-pending application filed in the United States Patent Office under date of February 10, 1916, and bearing Patent Number 1,264,234.

The invention has for its principal objects to simplify the construction and arrangement of parts employed in the carrying out of our invention, thereby reducing the cost of manufacture of the invention; to provide a structure adapted for opening directly into the gear box and for providing a removable cover to close the open top thereof; to provide means for locking the shifting levers in their desired position and to provide a means for preventing the accidental movement of one shifting lever when one of the others is being operated; to provide means for operating the neutralizer to permit the levers to be locked when the same are shifted into neutral position; and to provide means which will permit the disengagement of the clutch and will insure the desired gear engagement on the next engagement thereof.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Fig. 2 is a part sectional elevation of the gear shifting device.

Fig. 3 is a sectional view taken on line 3—3 of Fig. 2.

Fig. 4 is a sectional view taken on line 4—4 of Fig. 2.

Fig. 5 is a sectional view taken on line 5—5 of Fig. 2.

Fig. 6 is a sectional view taken on line 6—6 of Fig. 2, illustrating the mechanisms for locking the shifting levers.

Fig. 7 is a longitudinal sectional view of the ram carrying shaft extended through the shifter case.

Fig. 8 is a broken sectional view taken on line 8—8 of Fig. 2.

Fig. 9 is a sectional view taken on line 9—9 of Fig. 4, viewed in the direction of the arrows.

Fig. 10 is a view in plan of the gear box, the shifter box, the selector operating means and the clutch and ram operating connections.

Fig. 11 is a view in plan of the vehicle steering wheel illustrating the shifter selector.

Fig. 12 is a sectional view taken on line 12—12 of Fig. 14, wherein the ram shaft is illustrated as having been positioned and operated to cause the ram to operate one of the shifting levers.

Fig. 13 is a view in plan of a portion of the shifting mechanism with the parts positioned as in Fig. 12.

Fig. 14 is a view in detail sectional view of the pawl and coöperating plate for limiting the inward movement of the ram shaft.

Figure 1:
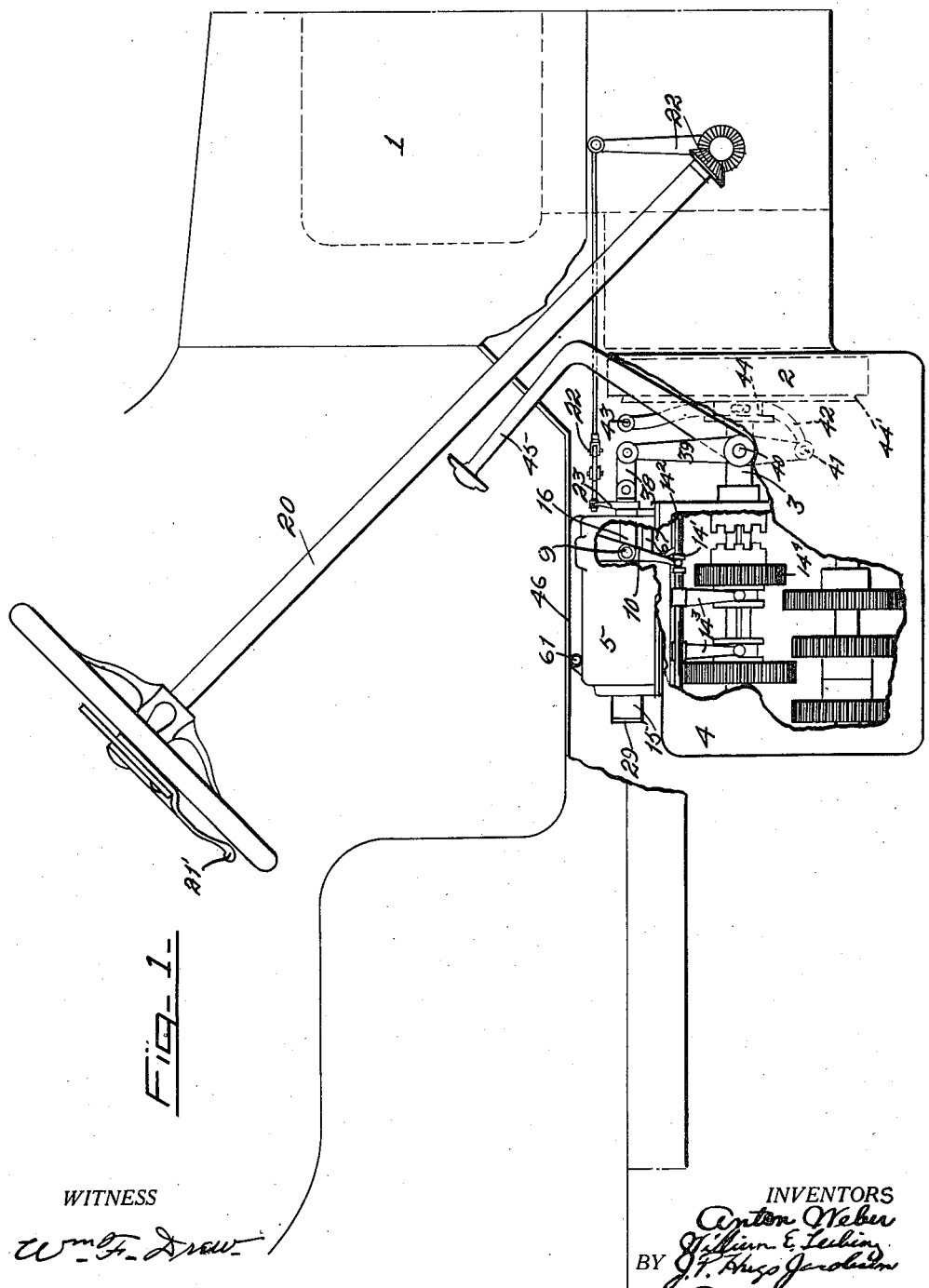
Figure 1 is a diagrammatic elevation illustrating the preferred embodiment of our invention as applied to a motor vehicle power plant of a well known type.

Referring more particularly to the several views of the drawings, wherein characters of reference designate corresponding parts,—1 indicates an engine or motor, which transmits power through a clutch 2 and shaft 3 to a suitable variable speed transmission of the selective type mounted in the open topped casing 4. Resting on the open top of the casing 4 and providing a closure therefor is the open bottomed shell or shifter casing 5 having a removable end plate 6 secured thereto in any suitable manner, as by screws 7. Mounted in bearings 8 at opposite sides of the shell or casing 5 and extending inwardly in alinement toward the center of the casing and spaced at their inner ends from each other are the supporting shafts 9, mounting the spaced, transversely disposed double levers 10 and 11 which respectively carry on their lower ends the integral extensions 12 and 13, each of which carries a pivoted segment 14 which coöperate with the shiftable collars 14' carried by the shaft 14² and which in turn coöperate, through forks 14³, with the shiftable gears 14⁴ in the case 4, and by a fore and aft movement shift the gears in any well known manner. The rearward movement of any one of the ends 10', 10², 11' or 11² of either of said levers 10 or 11, results in the engagement within the gear case 4 of one set of power transmitting gears, and when said levers are in their central positions, as in Figs. 1 and 2 of the drawings, the power transmitting gears, are in non-transmitting or neutral position. The device we have illustrated has provision for engagement of four different sets of power transmitting gears, this being the number most commonly employed, however, this number need not be so limited.

The opposite ends of said shifter casing 5 are provided with alined hubs 15 and 15' within which is sildably and rotatably mounted the longitudinally disposed tubular ram shaft 16. Suitably secured to the shaft 16 adjacent one end thereof is the forked ram member 17 formed with two arms 18 and 19 extending at right angles from the outer face thereof, the arms being set slightly less than 180 degrees apart, enabling the same to be moved successively into alinement with the ends 10', 10², 11' or 11² of the levers 10 and 11.

The rotation of the ram member 17 from the neutral position in Figs. 2, 4 and 5 to the position illustrated in dotted lines— Fig. 5, brings the arm 18 into alinement with the end 11' of the lever 11; further rotation brings the arm 19 into alinement with the end 10² of lever 10, the arm 18 lying between the lever ends 10' and 11'; further rotation successively brings the arm 18 into alinement with the lever end 10' of the lever 10, and the arm 19 into alinement with the lever end 11². It is apparent that in either of these positions, a forward movement of the ram 17 will move one of the levers 10 and 11 and shift the power transmitting gears. It will also be apparent that the shaft 16 is rotated to make the desired gear selector to be operated and is reciprocated to accomplish the actual shifting of the gears. The shaft is rotated preferably by the following mechanism, but it is to be understood that any convenient means may be employed.

Supported by the steering post 20 is a notched segment 21 in coöperation with which operates a lever 21' which connects through a system of rods, links, and levers 22 with an arm 23 extended from a plate 24 surrounding the shaft 16. The plate is secured to the shaft 16 to rotate the same by a pin 24', and said pin extends into a longitudinal slot 25 formed in the shaft, and which permits a longitudinal movement of the shaft relatively to the plate. The plate is provided with a hub 26 received in a depression in the hub 15, and said hub is provided with an annular groove 27 in which seats the inner edge of a plate or keeper 28 secured to the end of the hub 15.

The hub 15' is closed at its outer end by a plate 29. Mounted to slide in the tubular shaft 16 are the oppositely disposed trunnions 30 carrying on their outer faces the conical projections 31 which are received in the seats 32, carried respectively by the end plate 29 and the plunger 34 slidably mounted in the shaft, and detachably connected to the inner end of said plunger is one end of a bifurcated operating shaft 35.

The outer end of the plunger abuts against a sleeve 36 positioned in the outer end of the tubular shaft 16 and threaded over the end of the shaft is a retaining collar 37. The plunger 34 and shaft 35 are normally forced outwardly by a light coiled spring 34' which is positioned between and bears against the trunnions 30. By constructing and mounting the shaft in this manner, little effort is required to rotate the same.

The following mechanism moves the ram shaft 16 longitudinally to shift the gears. The end of the bifurcated shaft 35 is pivotally connected by a link 38 with one end of a lever 39 pivotally mounted within its length as at 40.

The lever is pivotally connected at its opposite end, as at 41, with one end of a clutch lever 42 fulcrumed as at 43, and within its length coöperating with a clutch collar 44 which coacts with the movable member 44' of the clutch 2. A clutch pedal 45 coöperating with the lever 39 and extending through the vehicle floor board 46 simultaneously operates on its downward movement the lever 42 and shaft 35. During the movement of the lever 42 to operate the movable clutch member 44 to disconnect the clutch, the shaft 35 is sliding idly through the sleeve 36 until such time as the movable clutch member 44 is fully disengaged, at which time the end of the plunger 34 contacts with the sleeve 36 causing a longitudinal forward reciprocation of the ram shaft which carries the ram 17.

The forward reciprocation of the ram 17 causes the arm 18 or 19 to contact with and operate the end of the lever 10 or 11 with which the same are in alinement. On the release of pressure from the pedal 45 the clutch springs (not shown) which act to maintain the clutch-members in frictional contact, through the lever 42 operate the lever 39, which forces the shaft 35 rearwardly against the tension of spring 34' until the inner shoulder 46 of the bifurcated end thereof contacts with the collar 37, at which time the ram shaft 16 is reciprocated rearwardly causing the ram 17 to assume its normal position. It will be noted that the clutch is released immediately prior to the forward reciprocation of the ram and the members thereof are engaged at such time as the ram shaft 16 is reciprocated rearwardly. By providing a limited movement of the shaft 35 relatively to the ram shaft 16, we are enabled to disengage the clutch without operating the shifting ram.

To prevent more than one combination of power transmitting gears being thrown into engagement at the same time, resetting means are provided for throwing said gears out of engagement or in neutral position prior to each forward movement of the shaft 16 after the selecting means has been operated for a new selection. Carried by the end plate 6 and projecting into the case 5 are a pair of shouldered rods 47 carrying the lugs 48 having beveled rear faces 48'. Slidably mounted on the rods 47 are the slotted sleeves 49 carrying the resetting head 50, of such size to lie within the ram arms 18 and 19, as in Fig. 5. The rearward movement of the head is limited by the engagement of the forward ends of the lugs 48 with the ends of the slots in the sleeves 49, as in Fig. 9. A resetting head operating dog 51, Figs. 3 and 4, which is rotatably mounted on a hub 52 on the ram 17 and is held to reciprocate therewith by the nut 53, carries the arms 53' and 53² which normally lie in contact with the rods 47, and engage the ends of sleeves 49—Fig. 2. The arms are normally retained in contact with the rods by a suitable spring 54 received in a bore 55 in the underside of arm 53², and which presses against a plunger 56 operating on a guiding surface 57, formed on the inner surface of the casing wall—Figs. 3 and 4. A suitable catch 49' having the forwardly beveled face 49² is mounted in a recess in the nut 53 and is normally forced outwardly by a spring 49³. The catch coöperates with a plate 49⁴ retained between the end plate 6 and the shouldered portions of the guide 47, and said plate is provided with spaced tongues 49⁵ projecting inwardly toward the nut 53, and having forwardly beveled rear surfaces 49⁶.

On the forward reciprocation of the ram 17 to shift the desired lever the beveled faces of the catch 49' and one of the lugs will contact, causing the catch to be depressed as it passes beneath the lug; the lugs being arranged in such a manner as to lie within the path of movement of the catch when the ram is oscillated for any desired shift selection. The dog 51 will also move forwardly with the ram with the arms thereof in contact with the rear ends of the sleeves 49, causing the resetting plate 50 carried thereby to contact with any one of the lever ends 10', 10², 11' or 11² which may be projecting, forcing the same into neutral position. During the continued forward movement of the ram to cause the operating of the selected lever by its alined arm, the arms 53' and 53² ride upwardly on the cam surfaces 48' on the rods 47, oscillating the dog on its bearing, and are guided to release from engagement with the rear of the sleeves 49 and to ride on the surface thereof. The releasing of the arms from the rear of the sleeves permits the opposite end of the selected lever to force the plate rearwardly on the rods 47 when the lever is operated. During the return movement of the ram the arms of the dog are prevented from assuming their normal position as the rear face of the catch 49' contacts with the forward straight face of the tongue 49⁵ beneath which it passed on its forward movement. This action of the catch 49' on the forward faces of the tongues 49⁵ insures the selecting and operating of the desired lever regardless of the operation or release of the clutch, and enables the vehicle operator, after once making the desired shift, to release the clutch without neutralizing the gears.

By rotating the ram shaft 16 when it is desired to operate another of said levers 10', 10², 11' or 11² than the one which is at present operated, the catch 49' will slip to one side of its coöperating tongue 49⁵ and pass in rear of the plate 49⁴, which permits the ram shaft 16 to be forced its full distance rearwardly, causing the arms 53' and 53² to move free of the rear ends of sleeves 49, at which time the pawl 56 and spring 54 will oscillate the dog 51 on the shaft 16 and cause the arms of the same to fall in rear of sleeves 49 to actuate the resetting plate to shift the actuated lever 10', 10², 11' or 11² to its neutral position on the next forward reciprocation of the shaft.

To insure that the ram in its forward travel will follow accurately in the proper path to enable one of its arms 18 or 19 to engage the desired shifting lever, a guide 58 is formed on the surface of the arm 19 and is adapted to coöperate with suitable guide slots 59 on the lower peripheral surface of the resetting plate 50, Figs. 2, 5 and 8. The slots are arranged in such manner that when the guide 58 is received therein the catch 49' will be adjacent one of the tongues 49⁵ of plate 49⁴.

To lock the levers from accidental displacement when in neutral or shifted position, a locking pawl 60 is pivotally mounted, as at 61, to the upper surface of the case 5 and extends at its forward end downwardly between the arms 10' and 11'. A spring 61' forces the free end of the lever downwardly, seating the locking lugs 62 projecting outwardly from opposite sides thereof in the notched recesses 63 on the upper edge of the arms 10' and 11', as in Figs. 2 and 6. The notched recesses 63 are arranged in such manner as to receive the lugs when the levers are shifted in either direction or are in neutral position. To release the lugs 62 from the recesses 63 prior to the shifting or resetting of the levers, a locking release arm 64 is carried by and projects outwardly from the front face of the resetting plate 50, and said arm has a beveled surface 65 which rides under the projecting portion 66 of the pawl 60 and raises the free end thereof to lift the lugs from the recesses at the beginning of the forward movement of the resetting plate 50. A collar 65' is carried by the ram shaft 16 in advance of the resetting plate 50 and moves the neutralizer plate rearwardly when the ram has been set and the neutralizer operated to shift the levers 10', 10², 11' or 11² into neutral position to permit the locking of the levers in such position.

To prevent the accidental moving of the levers 10 or 11 while the shifting or resetting of one of the levers is taking place and while the lugs are disengaged from their coöperating notched recesses, we provide a support 67 projected rearwardly from the front end of the casing to a point between the levers 10 and 11, and provide the same with a transverse bore 68—Figs. 2 and 6. In the bore are loosely mounted the plungers 69 having the rounded heads 70 which seat in recesses 71 in adjacent faces of the levers. A spring 71' seated in the cupped recesses 72 of the plungers 69 forces the same outwardly, and when one of the levers is shifted the slightest movement thereof in either direction causes the plunger associated therewith to be inwardly pressed until the inner end thereof contacts with the inner end of the adjacent plunger, thus preventing the plunger associated with the lever which remains stationary from being withdrawn from its seat.

Having thus described our invention, what we claim as new and desire to protect by Letters Patent is:—

1. A mechanical shifting device for variable speed power transmitting mechanism comprising a plurality of movable shifting members connected with the shiftable elements of said mechanism, selective operating means for actuating any one of said shifting members, devices for resetting said shifting members to normal position prior to the actuating of any one thereof, means for locking said shifting devices in either shifted or normal position, and means carried by the resetting means for releasing said locking means on the movement thereof.

2. A mechanical shifting device for variable speed power transmitting mechanism comprising a plurality of movable shifting members connected with the shifting elements of said mechanism, selective operating means for actuating any one of said shifting members, devices for resetting said shifting members to normal position prior to the actuating of any one thereof, means for preventing the movement of one shifting member during the movement of another member, means for locking said shifting members in either shifted or normal position, and means operated immediately prior to the shifting of said levers for releasing the locking means on the movement thereof.

3. A mechanical shifting device for variable speed power transmitting mechanism comprising a plurality of pivotally mounted axially disposed shifting levers connected with the shiftable elements of said mechanism, selective operating means for actuating any one of said shifting levers, a pivoted locking means for coöperating with said levers to lock the same in either their shifted or normal position, and devices for resetting said shifting levers to normal position prior to the actuating of any one thereof and for releasing said locking means during the movement of said levers.

4. A mechanical shifting device for variable speed power transmitting mechanism comprising a plurality of pivotally mounted axially disposed shifting levers connected with the shiftable elements of said mechanism, selective operating mechanism for actuating any one of said shifting levers, means coöperating with said levers and actuated on the movement of one to prevent the movement of the others during said movement, a pivoted locking means coöperating with said levers to lock the same in either their shifted or normal position, devices for resetting said shifting levers to normal position prior to the actuating of any one thereof, and means carried thereby for releasing said last mentioned locking means during the movement of said levers.

5. A mechanical shifting device for variable speed power transmitting mechanism, comprising a plurality of pivotally mounted axially disposed shifting levers directly connected at one end with the shiftable elements of said mechanism, and provided on adjacent side walls with depressions adapted to align when said levers are in neutral position, selective operating mechanism for actuating any one of said shifting levers, a support extended between said levers and provided with a bore for alining with the depressions in said levers when the levers are in normal position, oppositely disposed spring pressed locking plungers mounted in the bore of said support for coöperating with the depressions in said levers so that the movement of one of said levers forces the plungers into locked engagement with the depressions of the other of said levers to prevent the movement thereof.

6. A mechanical shifting device for variable speed power transmitting mechanism, comprising a plurality of pivotally mounted shifting levers connected at one end with the shiftable elements of said mechanism and provided with a plurality of notched locking recesses, selective operating mechanism for actuating any one of said shifting levers, a pivotally mounted locking pawl for coöperating with said locking recesses for locking said levers in their normal or shifted position, and means for disengaging said pawl from said recesses immediately prior to the shifting of said levers.

7. A mechanical shifting device for variable speed power transmitting mechanism, comprising a plurality of movable shifting members connected with the shiftable elements of said mechanism, selective operating means for actuating any one of said shifting members, devices for resetting said shifting members to normal position, means for locking said shifting members in either set or normal position, means carried by said resetting devices for releasing said locking means, and means for positively actuating said resetting devices to permit the locking of said shifting levers after the same have been set in neutral position.

8. A mechanical shifting device for variable speed power transmitting mechanism, comprising a plurality of movable shifting members connected with the shiftable elements of said mechanism, selective operating means capable of reciprocation for actuating any one of said shifting members, devices for resetting said shifting members to normal position, and means for preventing the actuation of said resetting devices until the selection of another of said shifting members.

9. A mechanical shifting device for variable speed power transmitting mechanism, comprising a plurality of movable shifting members connected with the shiftable elements of said mechanism, selective operating means capable of reciprocation for actuating any one of said shifting members, devices for resetting said shifting members to normal position, and means for permitting the reciprocation of said selective operating means independently of the operation of said resetting devices.

10. A mechanical shifting device for variable speed power transmitting mechanism, comprising a plurality of movable shifting members connected with the shiftable elements of said mechanism, selective operating means capable of reciprocation for actuating any one of said shifting members and of rotation for the selection of the shifting member to operate, devices operated by the first reciprocation of said operating means after the same has been rotated for the desired selection of said shifting member for resetting said shifting members to normal position, and means for preventing subsequent operations of said resetting means until after a different selection of shifting members has been made.

In testimony whereof we have signed our names to this specification in the presence of two subscribing witnesses.

ANTON WEBER,
WILLIAM E. LEIBING,
J. P. HUGO JACOBSEN.

Witnesses:
HARRY A. TOTTEN.
S. CONSTINE.